3,451,697
PIPE JOINT
Karl Bula, Lucens, Switzerland, assignor of one-half interest to Hans Jossi, Islikon, Switzerland
Filed Sept. 28, 1966, Ser. No. 582,661
Claims priority, application Switzerland, Oct. 2, 1965,
13,626/65
Int. Cl. F16l *19/00, 21/00*
U.S. Cl. 285—93
4 Claims

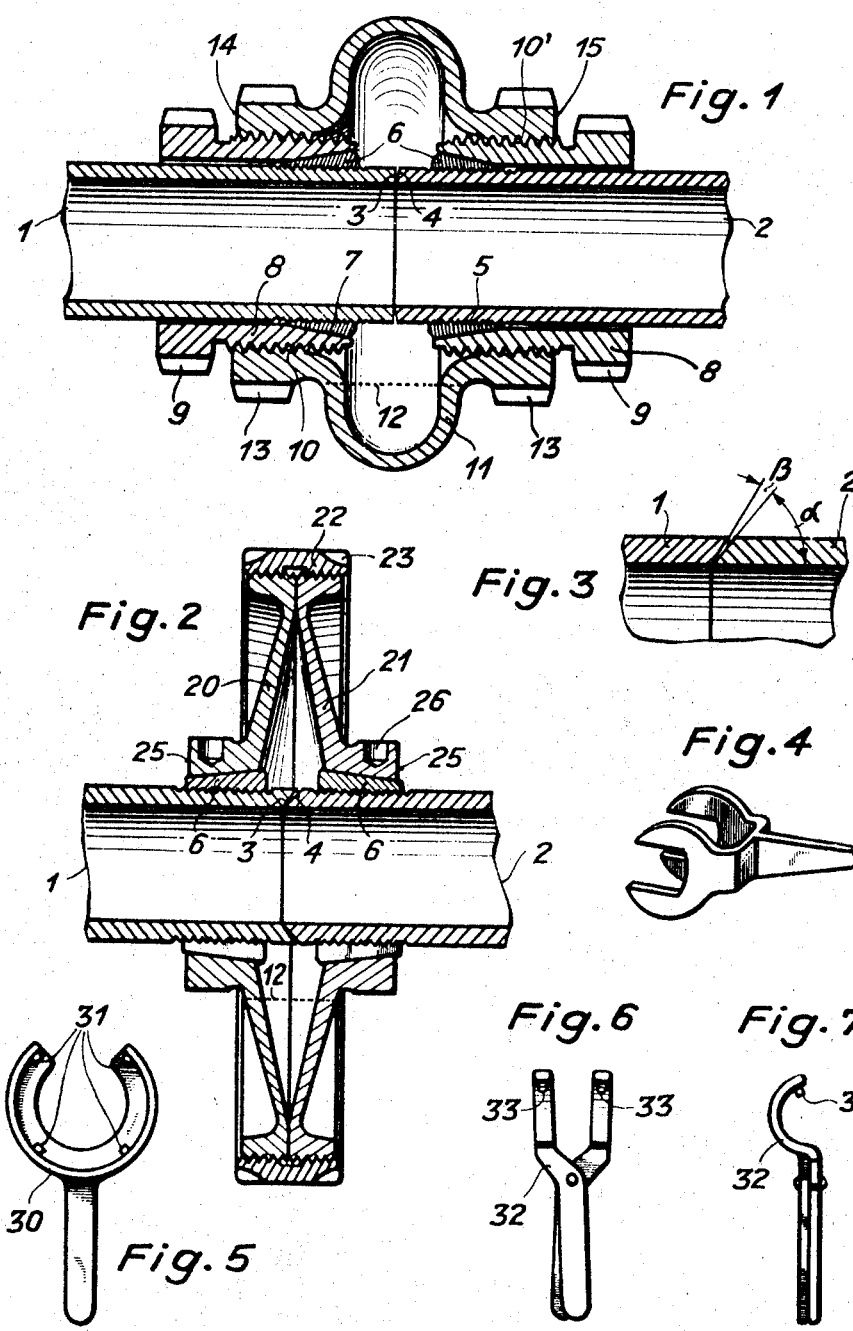

ABSTRACT OF THE DISCLOSURE

A pipe joint for pipes in abutting relationship held together by an annular pipe gripping member engaging one pipe and a second annular pipe gripping member engaging the other pipe and resilient means to urge the annular members towards one another with deformation as to the two pipe ends.

---

This invention relates to a pipe joint which is adapted to be undone and in which two plain metal pipes are gripped close to their ends at grooves and are pressed one against the other at their end faces by means of a screw connection. It is characterised by the combination of the following features:

(a) that the area of contact of the two pipe ends is reduced by suitable shaping to about one half or less of the cross-section of the pipe wall, (b) that the screw connection is supported on the pipes by way of annular jaws, each of which engages in a plurality of grooves in the outside of the pipe walls, and (c) that the screw connection comprises a spring element which is flexible in the axial direction.

A pipe joint is known in which plane-turned ends of two pipes are pressed one against the other in a butt joint and in which retaining rings in the form of spring rings of steel wire are arranged in peripheral corrugations, tubular sleeves having facing turned recesses at their ends being pushed over the rings.

While this pipe joint operates reliably at room temperature up to moderate pressures, it leaks as soon as a medium with a considerably varying temperature flows in the pipes. The known pipe joint is also not adequate at high pressures and with a simultaneous high temperature. It has therefore become a widespread view, in particular in process engineering, that for media with a sharply varying temperature only a welded pipe joint remains leakproof in the long run. If, however, a pipe joint must be undone frequently, a welded joint proves to be extremely costly and also always requires the presence of a skilled welder. Furthermore, the opening up of the pipes and welding them together again are very time-consuming and involve the danger of the plant being contaminated by globules of metal produced by the welding, particles of slag, etc.

The object of the invention is a pipe joint which can be undone and which is suitable in particular for process engineering, in which high and frequently changing temperatures and high pressures occur. According to the invention, this aim is achieved in that the bearing surfaces at the pipe ends are considerably reduced in comparison with the cross-section of the pipe walls, so that when the pipes are pressed together the pipe material is plastically deformed over the entire periphery, forming a continuous sealing surface. At the same time, however, care is taken that along the path over which the contact or pressing force is produced, that is in the transition from the pipe ends to the screw connection, and also in the connection itself, no plastic changes of shape comparable with the deformation at the sealing surface can occur, in that two annular jaws engage in a plurality of grooves in the pipes, the result of which is a uniform distribution of moderate stresses. As a third and very essential feature, it is provided that the screw connection contain an element which is relatively softly springy in the axial direction and which does not allow the initial tension at the sealing point to deviate from its desired value in a manner which is not permissible even when thermal expansion occurs in the pipes and/or in the screw connection.

It has proved to be advantageous to shape the end faces of the pipes so that, when a small contact or pressing force is applied, they first touch one another practically exclusively along a circular line and, as the contact force increases, over an annular surface which becomes increasingly broader, with a deformation which is at first elastic and later also plastic.

This can be achieved in that at least one of the pipe ends is shaped so that it is slightly convex or conical at its end face. With a convex end face, the centre of curvature of the generatrix of the surface of revolution may be located as desired, but the centre is advantageously so chosen that the initial sealing line is located close to the inside of the pipe walls, since in this way the gap on the inside is kept small and more favourable sealing conditions are created.

While, with very accurate machining and very careful assembly, it may be favourable, in order to simplify the holding of stocks, to pair projecting end faces with projecting end faces, it has proved to be advantageous, under the not always ideal conditions occurring in practice, to combine projecting or salient end faces with plane or with receding or reentrant end faces, because in fact when similar sealing surfaces are paired leaks may already occur in the event of small eccentric displacements of these surfaces with respect to one another.

The combination of a salient conical surface with a reentrant conical surface has proved to be particularly advantageous, because there is inherent in this pairing not only a centring effect, but also a supporting effect, which latter becomes important if the pipe joint is subjected to bending stresses. Half the apex angle of the salient cone, which is referred to hereinafter as $\alpha$, should be equal to 30 to 85° and the difference with respect to half the apex angle of the reentrant cone, which difference is referred to hereinafter as $\beta$, should be equal to 0.5 to 5°.

If very high demands are made of the fluid-tightness of the pipe joint, attention must also be paid to the microform of the end faces. Tests have shown that, in order to avoid the spiral grooves formed during turning as a result of the feed, the sealing surfaces should be worked by the shaping turning technique, that is the turning tool may only be fed inwards during the turning operation, but not shifted parallel to the end face. In the case of thick pipe walls, the use of chip breaking grooves and, if necessary, also of two turning tools, which are offset at the periphery and in engagement simultaneously, may become necessary.

If the end faces are machined by this method, it is generally possible, even when the highest demands are made, to dispense with the application of a soft intermediate sealing layer, for instance the application of a thin coating of silver or gold by electrode position.

Another feature of the invention consists in that the annular jaws are cut open by a longitudinal slit, so that when assembly is carried out they can easily be spread open by means of a screwdriver, pushed axially over the end of the pipe and brought into engagement in the grooves, which are preferably produced by means of rollers. The annular jaws bear on the pipe wall transversely of the grooves over a length of at least twice the thickness of the pipe wall. In this way, not only is a good distribution of stresses obtained, but at the same time the possibility is created of bending moments which may possibly act on the pipes being absorbed by the screw connection, so that the sealing surface is not loaded by substantial additional stresses.

According to the invention, with a view to rendering such bending moments harmless, as rigid a joint as possible between the pipe ends and the screw connection is aimed at. This is ensured by means of an external conical surface on the annular jaws, by means of which surface the jaws are wedged tight between suitably shaped cones of the screw connection and the grooved zone of the pipe wall when the screw connection is tightened.

A particularly significant feature of the invention consists in that the spring element forming a part of the screw connection is designed so that it is yieldingly flexible in the axial direction, whereas it is as rigid as possible in all other directions. To this end, those parts of the spring element which are most markedly flexible are arranged as far distant as possible from the axes of the pipes, but at least outside an imaginary cylinder coaxial with the pipes and having the mean pipe diameter as its radius, said flexible parts preferably forming a closed, hollow body of revolution. With great softness in the axial direction, such a spring element can also take up considerable bending and torsional moments without the corresponding deformation and stresses at the sealing surface becoming serious. A spring element after the fashion of a section of corrugated piping has proved to be favourable in this connection.

Further features of the invention will appear from two embodiments illustrated diagrammatically in the drawing, in which:

FIGURE 1 is a longitudinal section through a first pipe joint with a corrugated-pipe-like spring element;

FIGURE 2 is a longitudinal section of a second pipe joint with two spring elements;

FIGURE 3 shows by way of example a partial section through two pipe ends;

FIGURE 4 illustrates in perspective view a twin forked spanner of the kind of which two are used for assembling the pipe joint according to FIGURE 1;

FIGURE 5 is a front view of one spanner, while FIGURES 6 and 7 are a front view and a side elevation, respectively, of a second spanner which are used for assembling the pipe joint according to FIGURE 2.

Referring to the drawings, FIGURE 1 shows two pipe ends 1 and 2 which abut against one another at their end faces 3 and 4, respectively. The end face 3 is plane, whereas the end face 4 is shaped so that is projects conically to a slight extent. Half the apex angle of the cone 4 is equal to 87°. The outside of the walls of the pipes 1 and 2 has close to their ends a zone provided with circular grooves 5, which resembles a thread in longitudinal section. Corresponding teeth or ridges of annular jaws 6 are located in and fit these grooves. The annular jaws are split at a point on their peripheries, so that for assembly purposes they can be spread open with a screwdriver and placed over the end of the pipe on to the grooved zone. The annular jaws 6 are in contact with sleeves 8 by way of slender, conical surfaces 7, the sleeves having a hexagonal head 9 at one end and being in engagement by way of right-hand and left-hand threads 10, 10', respectively, with corresponding threads of a spring element 11. The flexible portion of this spring element 11 consists of a corrugated pipe section which is located substantially outside an imaginary cylinder coaxial with the pipes 1 and 2 and having a radius corresponding to the mean diameter of the pipes. The lowest directrix of this imaginary cylinder is indicated by way of comparison by a dotted line 12.

The spring element 11 has a hexagonal head 13 at both ends for assembly purposes.

FIGURE 2 shows a second constructional form of the pipe joint according to the invention. The parts corresponding to those shown in FIGURE 1 are marked with the same reference numerals. In contrast to the first constructional form, the second constructional form has two spring elements and one sleeve instead of two sleeves and one spring element, the spring elements being designated by the references 20 and 21 and the sleeve by the reference 22. The spring elements are in the form of slightly conical discs which are mounted internally on and fit the cones of the annular jaws 6 and are clamped together externally by the bush 22 by means of a right-hand and a left-hand thread. Provided in hub portions 25 of the spring elements 20, 21 are blind radial bores 26 for the engagement of a retaining key or spanner, while the bush 22 has radial slots 23 at its periphery at which a spanner can be applied.

FIGURE 3 shows on a larger scale a diagrammatic section through the end faces in the embodiment according to FIGURE 2. The end of the pipe 1 has a reentrant cone, while that of the pipe 2 has a salient cone. Half the apex angle of the reentrant cone is larger than half the apex angle $\alpha$ of the salient cone by the angle $\beta$, before deformation.

If the ends of the pipes 1 and 2 are put together, the cones exert a bearing action only at the inner edge at first. As the bearing pressure increases, the area of contact is widened outwardly with an elastic and plastic change of shape.

FIGURE 4 shows a twin forked spanner of the kind of which two are used for the purpose of assembling the device according to FIGURE 1. With one of the spanners, the two sleeves 8 are retained simultaneously at their hexagonal heads 9, while the spring element 11 is turned with the other twin forked spanner, which is engaged at the hexagonal heads 13. As the threads 10, 10' are right-hand and left-hand threads, respectively, or (according to an alternative form) have different pitches, the pipe joint is tightened or slackened during this turning operation. In order to adjust the correct initial tension of the spring element 11 at any given time, the extension thereof is measured at the accurately machined surfaces 14, 15. So that these measuring surfaces may be more readily accessible, the width of the hexagonal head 9 between the flat surfaces thereof is considerably smaller than that of the hexagonal head 13.

FIGURE 5 shows a spanner 30 which can be made to engage in the slots 23 of the bush 22 (FIGURE 2) by means of lugs 31 in order to tighten the bush 22.

Finally, FIGURES 6 and 7 illustrate in front view and side elevation, respectively, a retaining tool 32 which is applied in the blind bores 26 by means of pins 33 in order to retain the two spring elements 20 and 21 during assembly when the bush 22 is turned. In order to adjust the correct initial tension in the arrangement according to FIGURE 2, the already fitted spring elements 20 and 21 are pressed against one another at the hubs 25 and at the same time the width of the gap forming peripherally between the spring elements 20, 21 is measured, say by means of a caliper gauge, before the bush 22 is introduced. If the width of the gap does not coincide with its nominal value, one of the annular jaws is shifted. Only then is the bush 22 slipped on, with its left-hand thread directed towards the spring element with the left-hand thread, and the two spring elements are thereafter screwed manually into the bush 22, for the same distance on both sides of the bush 22 and as long as the spring elements can be turned manually. The retaining tool 32 is then applied in the blind bores 26 by means of the pins 33 and the spring elements 20, 21 are thereby retained, while the bush 22 is rotated in the closing sense by means of the spanner 30 until the peripheral marginal portions of the spring elements are bearing hard one against the other.

If, when the initial tension is adjusted, the shifting of the annular jaw by the width of one groove does not give a sufficiently fine change in the width of the gap, it is possible to use in addition annular shims which can be introduced into the peripheral gap. A simple, although risky, means would consist in forming the grooves 5 not circularly, but as a screw thread, at least on one side. The advantage of continuous adjustability would, however, be bought with the risk that an annular jaw might be twisted during assembly and that the initial tension of the spring element might thereby be falsified. According to the invention, in the constructional form according to FIGURE 2, the gradation is reduced, in that the groove spacing on the right and left is chosen unequal, for example in the ratio of 4:5. If now, for example, both annular jaws are each shifted to the right by one groove, the width of the gap changes by only 20% of the larger spacing.

A comparison of the two constructional forms according to FIGURES 1 and 2 shows that the first has the advantage of rapid and easy adjustment of the initial tension. The prerequisite for this purpose is that the spring characteristic of the spring element 11 is predetermined by computation or empirically. The measurement of the length of the spring element which is necessary each time the pipe joint is tightened can be facilitated by mounting a suitable length-measuring instrument on one of the twin forked spanners, so that the measurement can be carried out continuously.

In comparison with the foregoing, the constructional form according to FIGURE 2 has the advantage that, once it has been adjusted, the device can be tightened hard again each time it has been released, practically the same initial tension being always obtained without measurement. Moreover, in this embodiment, the fact that it is somewhat more rigid has a favourable effect, since no thread surfaces 10 are located in the direct flow of force.

Certain simplifications are possible by departing from the symmetrical form. Thus, for example, in FIGURE 1 the left-hand sleeve 8 can be imagined combined with the spring element. As a result, not only the left-hand screw joint 10, but also the corresponding hexagonal heads 9 and 13 would be eliminated. The disadvantage, however, would be that when the screw connection, which is now reduced by one part, is tightened, twisting would occur at one of the conical surfaces 7 or of the zones of the grooves 5. Both would be associated with increased friction, however, and a torsional moment would moreover be exerted on one of the pipe ends, which should already be avoided in view of the possibility of damage to the end faces 3 and 4. According to the invention, the symmetrical arrangement is therefore given preference.

I claim:
1. A pipe joint comprising two pipes the ends of which are in an abutting sealing engagement and a pipe coupling comprising a first annular gripping member engaging one of said pipes by screw connection and a second annular pipe gripping member engaging the other of said pipes by screw connection, and spring-like means, which is flexible in the direction of the axes of the said pipes and coating means between said spring-like means and said gripping members constantly urging the first and second annular members towards one another in such a way that the abutting pipe end surfaces of said pipes are plastically deformed to form a fluid-tight seal, the area of contact of the two pipe ends being not more than one half the cross section of a wall of the pipes, each resilient portion of the spring-like means being arranged substantially radially outside of an imaginary cylinder coaxial arranged to the pipe, said cylinder having a radius equal to the mean pipe diameter, the resilient portion of the spring-like means comprises a spring element having a central section of generally semi-annular cross-section, and the spring element being provided with surface means allowing measurement of the longitudinal expansion during tensioning of the screw connection.

2. A pipe joint as claimed in claim 1 in which the pipes have conical end faces, characterised in that one conical surface is reentrant and the other salient and that half the apex angle of the reentrant cone is larger by 0.5 to 5° than half the apex angle of the salient cone.

3. A pipe joint as claimed in claim 1, characterised in that the annular pipe gripping members are split and each of them engages by means of a plurality of circularly extending teeth in grooves provided on the pipes.

4. A pipe joint as claimed in claim 1, characterised in that the annular pipe gripping members have external conical surfaces on which the resilient means is supported.

References Cited

UNITED STATES PATENTS

| 1,533,886 | 4/1925 | Mueller et al. | 285—354 X |
| 1,703,696 | 2/1929 | Stratford | 285—388 |
| 2,305,668 | 12/1942 | Bruno | 285—334.4 X |
| 2,531,922 | 11/1950 | Seamark | 285—354 X |
| 2,567,113 | 9/1951 | Kristensen | 285—175 X |

FOREIGN PATENTS

| 685,502 | 4/1930 | France. |
| 721,754 | 6/1942 | Germany. |
| 268,353 | 11/1929 | Italy. |
| 598,864 | 10/1959 | Italy. |

CARL W. TOMLIN, *Primary Examiner.*

D. W. AROLA, *Assistant Examiner.*

U.S. Cl. X.R.

285—39, 175, 187, 334.4, 353, 364